(12) United States Patent
Pishdadian

(10) Patent No.: US 11,612,035 B2
(45) Date of Patent: Mar. 21, 2023

(54) ENERGY SOURCE BACKUP CHARGING POWER SUPPLY THAT ADAPTS TO A VARIABLE INPUT VOLTAGE

(71) Applicant: NORTH AMERICAN MANUFACTURING ENTERPRISES, INC., Staten Island, NY (US)

(72) Inventor: Hamid Pishdadian, Warick, RI (US)

(73) Assignee: North American Manufacturing Enterprises, Staton Island, NY (US)

( * ) Notice: Subject to any disclaimer, the term of this patent is extended or adjusted under 35 U.S.C. 154(b) by 0 days.

(21) Appl. No.: 17/583,428

(22) Filed: Jan. 25, 2022

(65) Prior Publication Data
US 2022/0256668 A1    Aug. 11, 2022

Related U.S. Application Data

(63) Continuation of application No. 16/680,665, filed on Nov. 12, 2019, now Pat. No. 11,234,309, which is a continuation of application No. 15/422,505, filed on Feb. 2, 2017, now Pat. No. 10,477,642.

(51) Int. Cl.
| | | |
|---|---|---|
| H05B 45/38 | (2020.01) | |
| H02J 9/06 | (2006.01) | |
| H05B 45/3725 | (2020.01) | |
| H02J 7/00 | (2006.01) | |
| H02J 7/34 | (2006.01) | |

(52) U.S. Cl.
CPC .............. *H05B 45/38* (2020.01); *H02J 7/007* (2013.01); *H02J 9/061* (2013.01); *H05B 45/3725* (2020.01); *H02J 7/345* (2013.01); *Y02B 20/30* (2013.01)

(58) Field of Classification Search
CPC .... H05B 45/37; H05B 45/3725; H05B 45/38; H05B 45/50; H02J 7/007; H02J 7/345; H02J 9/061; Y02B 20/30
USPC ...................................................... 307/19, 65
See application file for complete search history.

(56) References Cited

U.S. PATENT DOCUMENTS

| | | | | |
|---|---|---|---|---|
| 9,089,016 B2 * | 7/2015 | Recker | ................... | H05B 47/13 |
| 9,755,448 B2 * | 9/2017 | Shaw | ......................... | F21S 8/02 |
| 2014/0361688 A1 | 12/2014 | Recker | ...................... | H02J 9/02 |
| | | | | 315/86 |
| 2016/0230973 A1 | 8/2016 | Shaw | ................. | H05B 33/0884 |
| 2016/0356469 A1 | 12/2016 | Garcia | .................. | H02J 7/0086 |

FOREIGN PATENT DOCUMENTS

WO    WO-2011024062 A2    3/2011    ............. H05B 37/00

* cited by examiner

*Primary Examiner* — Hal Kaplan
(74) *Attorney, Agent, or Firm* — Clifford H. Kraft

(57) ABSTRACT

A power supply that senses the variable voltage on LED devices and uses this voltage to force current into a storage device such as a battery to charge it. When power fails, a DC-DC boost converter supplies the necessary voltage taking current from the battery to maintain the LEDs at percentage nominal current level.

8 Claims, 1 Drawing Sheet

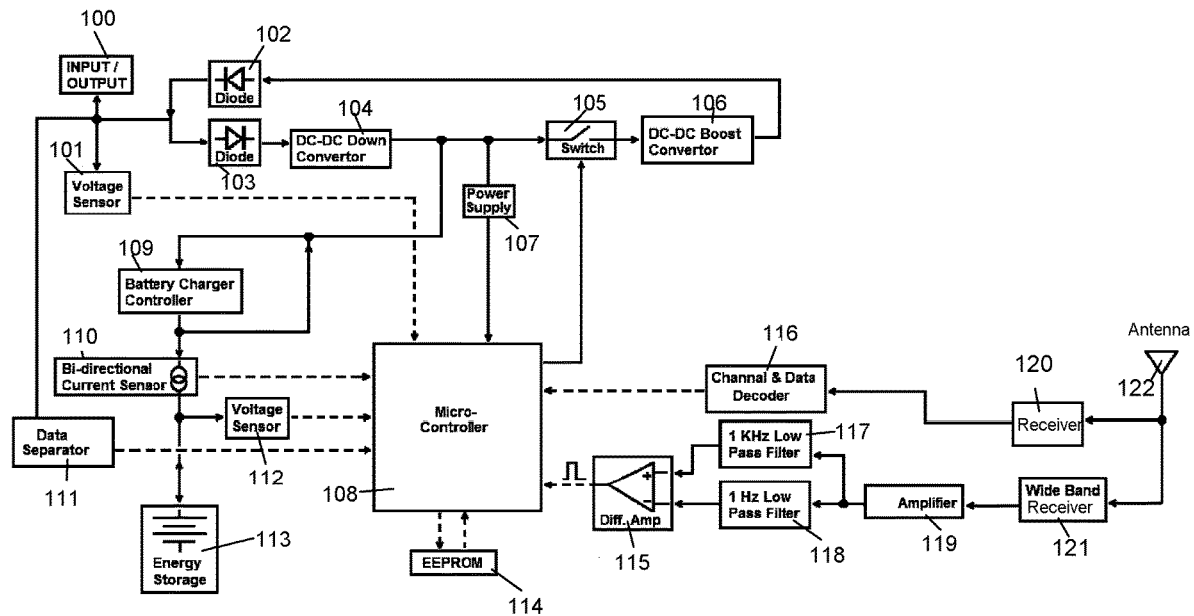

ENERGY SOURCE BACKUP CHARGING POWER SUPPLY THAT ADAPTS TO A VARIABLE INPUT VOLTAGE

This is a continuation of application Ser. No. 16/680,665 filed Nov. 12, 2019, which was a continuation of application Ser. No. 15/422,505 filed Feb. 2, 2017. Applications Ser. No. 16/680,665 and Ser. No. 15/422,505 are hereby incorporated by reference in their entirety.

BACKGROUND

Field of the Invention

The present invention relates to backup power for lighting systems and more particularly to a backup power supply that takes power directly from LED drivers to charge an energy storage device.

Description of the Prior Art

Backup power supplies for lighting systems typically consist of a battery that is charged continuously from line power under normal circumstances. During a power failure, the lights are run from the battery, usually at a reduced intensity level to conserve charge. LED lighting systems are becoming common and in loss of line power situations, are required to run at a percentage, say 25% nominal current for emergency lighting. Batteries are continuously charged from building line power when power is present.

Many newer lighting systems have components connected to data networks (see my concurrently filed patent application Autonomous Distributed Lighting System). Each node of such a system is typically wired to a building data network with a CAT-5 or CAT-6 cable or similar connection. The physical and link layers of such systems typically run Ethernet™ with higher layers using IP, TCP and/or proprietary protocols. Such cables usually have only data signal levels upon them depending upon the particular physical layer architecture. Using DC levels on network cables, various nodes and peripherals in a network can also be powered.

Actual LED lighting fixtures typically require too much current for LED power to be taken directly from network wiring. Power switch nodes on the network attached to building AC line power can supply the power required for the LED drivers. Other simpler systems just control LED drivers from power supplies that are not networked.

In either case, battery backup is necessary in building lighting for safety, and because most batteries are charged from building line power, there develops a requirement to locate backup units in proximity to building power outlets or availability. It would be advantageous if backup chargers did not need to use building line power, and could draw power from LED drivers.

SUMMARY OF THE INVENTION

The present invention relates to a power supply that senses the variable voltage on LED devices and uses this voltage to force current into a storage device like a battery to charge it. When power fails, a DC-DC boost converter supplies the necessary voltage taking current from the battery to maintain the LEDs at some percentage of LED's nominal value, such as for example, 25%. This amount depends on the system and may typically be chosen by the user.

DESCRIPTION OF THE FIGURES

One or more figures are now presented to illustrate features of the present invention:

The figure shows a block diagram of an embodiment of a battery charging source.

One or more illustrations and figures have been presented to aid in understanding the present invention. The scope of the present invention is not limited to what is shown in the figures.

DESCRIPTION OF THE PREFERRED EMBODIMENTS

The figure shows a block diagram of a power backup system and battery charger that takes power directly from LED drivers to charge batteries and provide self-powering for the charger logic. The charger may be a "smart" peripheral that can communicate over a network, or it may be passive. The input voltage from an LED driver is connected to the input port 100. In the case of a network, a data separator 111 supplies data from a special LED driver to a controller 108 that executes stored instructions stored in a memory. Typically, data from the network is used to notify the controller 108 that line power has been lost, or that line power has been restored.

Power from an LED driver is received and delivered by the input port 100. LED drivers are usually based on a constant current design, which means they will supply a fixed current to one or more LED boards, and hence, may have a variable voltage. A voltage monitor 101 is used to sample the input voltage and make the value available to the controller 108. The controller keeps track of the voltage on the input port and remembers (stores) the maximum value ever measured. Meanwhile, periodically, the stored value of the maximum voltage is reduced by a learning coefficient. This can be a numerical multiplier, or it can be an algorithm for reducing the peak voltage value. It typically takes several days for the learning coefficient to reduce the maximum value to a predetermined minimum value if there are no new higher readings. Using this technique, the device adapts to any voltage from a nominal minimum to a nominal maximum. These nominal values may be changed by a user to match any specific application requirements.

Operation is as follows: the input diode 103 is turned on if LED drive voltage is present at the input. The DC-DC converter 104, along with a charge controller 109, is used to properly charge the battery or other energy storage device (such as a capacitor) 113. The DC-DC down-converter 104 is typically necessary because the LED drive voltage to an LED printed circuit board is usually higher than the voltage needed to charge the battery 113 or other storage device. The circuit shown in the figure redirects a small amount of the current from the DC-DC converter 104 to charge the energy storage system 113 and to operate the device. This amount should be less than approximately 1% of the total power supplied to the LEDs. This small amount is not be noticeable by room occupants.

A bidirectional current monitor 110 measures the charge and discharge currents to and from the energy storage system 113. Since, as stated, backup systems are typically required to produce a percentage of the power normally supplied to the fixture during power outages, there must be a mechanism to measure the current supplied to the LED fixture (the load). The first time power is lost, a device turn-on switch 105 enables a DC-DC booster 106. The DC-DC booster 106 generates the same voltage as the adjusted peak voltage previously measured. Current flows back into the system from the DC-DC booster 106 through the diode 102. The current monitor 110 is used to keep track of the current taken from the battery or energy storage system required to produce this voltage. The actual voltage at the energy storage system 113 is reported to the controller 108 by a voltage sensor 112. By dividing the ratio of the voltage at the energy storage measured by the voltage sensor 112 by the voltage measured at the input by another voltage sensor 101, and knowing the efficiency of DC-DC boost converter 106, it is possible to calculate the LED load current. This value is stored in a memory 114 that can be an EEPROM or other memory device and can be used to properly generate the percentage nominal current value needed by the LEDs during the power loss condition. Power loss is detected using different methods for different applications. DC power for the controller 108 and memory 114 is supplied by the power supply 107.

There are at least three cases of power loss detection. Cases 1 and 2 are typically used when the charger is used separate from a network. Case 3 is more typically used with systems attached to a network.

Case 1

A remote radio transmitter is connected to the uninterrupted building power line in the vicinity of the backup system. This transmitter may operate on an ISM band or on a licensed frequency. A preferred frequency is 433 MHz; however, any other frequency may be used. When line power is lost, this transmitter can transmit a signal reporting the status of the power line. This signal is received by an antenna 122, converted by an RF receiver 120 and decoded by channel and data decoder 116 and passed to the controller 108. Upon verification of the data integrity, the turn-on switch 105 is turned on, and the DC-DC booster 106 is enabled. The current measured by the bidirectional current sensor 110 is used to generate a constant current corresponding to the fixture requirement as described above. When power is restored a second radio signal is transmitted, and the system is returned to the charging state.

Case 2

If a remote RF transmitter is not feasible due to long distance or other issues, then a low data rate wireless power-loss detection system can be used. This is a system that sends low frequency modulated data. Radio frequency information is received by the antenna 122 and is converted to an AC signal by a wide-band receiver 121. A detected signal is amplified by an amplifier 119 followed by two separate low pass filters with cutoff frequencies of 1 Hz 118 and 1 KHz 117. A differentiator 115 compares the two filtered AC signals and generates a single pulse representing loss of power, and a reverse polarity pulse when power is restored. This information is then used to generate constant current as described in Case 1. Other filters and frequencies may be used.

Case 3

In networked lighting applications, the driver driving the LED load is always powered; however, the driver only generates the constant current when commanded by the system. A special LED driver can be designed to transmit a data packet on the LED drive line indicating low voltage to the charger upon the loss of power to the LED driver. This signal is received by the data separator 111 and decoded by the controller 108. As in cases 1 and 2, a constant current is generated. Upon power restoration, a different command is sent in order to stop the backup process and resume charging.

It should be noted that the term controller or processor used in this application means any circuit or device capable of performing logic or computations including a wired logic circuit, a microcontroller, a microprocessor, a laptop, desktop, server, a smartphone, a pod computer and any processor that can execute stored instructions from a memory. Database means any storage of data on any computing device including a server, desktop computer or any other computer. Network means any wired or wireless means of transmitting data from one point to a point remote from the first point.

Several descriptions and illustrations have been presented to aid in understanding the present invention. One with skill in the art will realize that numerous changes and variations may be made without departing from the spirit of the invention. Each of these changes and variations is within the scope of the present invention.

I claim:

1. An LED lighting system backup charger comprising:
an input port constructed to be electrically connected to an LED driver, voltage from the input port being converted to a battery charging voltage by an electrically connected DC-DC down-converter;
a battery charge controller accepting current from the DC-DC down-converter and supplying charging current to an energy storage system;
a bidirectional current sensor sensing current flow to or from the energy storage system, wherein when power is present at the input port, the energy storage system charges;
a first voltage sensor sensing voltage at the energy storage system;
a logic system, which upon loss of input power, activates a DC-DC boost converter that is electrically attached to the bidirectional current sensor attached to the energy storage system that produces a voltage sufficient to power LEDs from the input port at a reduced current.

2. The LED lighting system backup charger of claim 1 wherein the energy storage system is a battery.

3. The LED lighting system backup charger of claim 1 wherein the energy storage system is a capacitor bank.

4. The LED lighting system backup charger of claim 1 wherein, the logic system is a controller executing stored instructions from a memory.

5. The LED lighting system backup charger of claim 1 wherein the logic system uses voltage measured at the input port to compute a nominal input voltage scaled over a predetermined time period by a learning factor to lie between a nominal minimal voltage and a nominal maximum input voltage.

6. The LED lighting system backup charger of claim 1 wherein, the logic system divides the voltage at the energy storage system measured by the first voltage sensor by the voltage at the input port, and by taking into account an efficiency of the DC-DC boost converter determines a 25% load current for the LEDs.

7. The LED lighting system backup charger of claim 1 wherein the logic system is notified of a power down condition by an RF link.

8. The LED lighting system backup charger of claim 1 wherein the logic system is notified of a power down condition by data transmitted from an LED driver into the input port, wherein this data is separated and supplied to the logic system by a data separator.

* * * * *